(12) United States Patent
Jia et al.

(10) Patent No.: US 7,958,513 B2
(45) Date of Patent: Jun. 7, 2011

(54) METHOD, SYSTEM AND PROGRAM PRODUCT FOR COMMUNICATING AMONG PROCESSES IN A SYMMETRIC MULTI-PROCESSING CLUSTER ENVIRONMENT

(75) Inventors: Bin Jia, Poughkeepsie, NY (US); Richard R. Treumann, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1412 days.

(21) Appl. No.: 11/282,011

(22) Filed: Nov. 17, 2005

(65) Prior Publication Data

US 2007/0174558 A1    Jul. 26, 2007

(51) Int. Cl.
*G06F 9/44* (2006.01)
(52) U.S. Cl. ..................... 719/313; 719/312
(58) Field of Classification Search .............. 719/310, 719/312, 313, 315; 709/215, 240; 711/141, 711/146, 147; 710/22
See application file for complete search history.

(56) References Cited

U.S. PATENT DOCUMENTS

| | | | | |
|---|---|---|---|---|
| 4,818,984 | A * | 4/1989 | Chang et al. | 340/10.31 |
| 5,428,803 | A * | 6/1995 | Chen et al. | 712/6 |
| 5,964,838 | A | 10/1999 | Cheung et al. | 709/224 |
| 6,014,690 | A * | 1/2000 | VanDoren et al. | 709/215 |
| 6,085,276 | A * | 7/2000 | VanDoren et al. | 710/240 |
| 6,094,686 | A | 7/2000 | Sharma | 709/240 |
| 6,101,420 | A * | 8/2000 | VanDoren et al. | 700/5 |
| 6,105,113 | A * | 8/2000 | Schimmel | 711/146 |
| 6,108,737 | A * | 8/2000 | Sharma et al. | 710/107 |
| 6,108,752 | A * | 8/2000 | VanDoren et al. | 711/117 |
| 6,122,714 | A * | 9/2000 | VanDoren et al. | 711/150 |
| 6,154,816 | A * | 11/2000 | Steely et al. | 711/150 |
| 6,249,520 | B1 * | 6/2001 | Steely et al. | 370/368 |
| 6,338,146 | B1 * | 1/2002 | Johnson et al. | 714/4 |
| 6,477,535 | B1 * | 11/2002 | Mirzadeh | 1/1 |
| 6,578,131 | B1 * | 6/2003 | Larson et al. | 711/216 |
| 6,601,089 | B1 | 7/2003 | Sistare et al. | 709/213 |
| 6,629,152 | B2 * | 9/2003 | Kingsbury et al. | 719/313 |
| 6,738,871 | B2 | 5/2004 | Van Huben et al. | 711/150 |
| 6,779,049 | B2 * | 8/2004 | Altman et al. | 710/22 |
| 6,782,537 | B1 | 8/2004 | Blackmore et al. | 719/313 |

(Continued)

OTHER PUBLICATIONS

Scales et al. "Fine-Grain Software Distributed Shared Memory on SMP Clusters" WRL Research Report 97/3, Feb. 1997, 32 pages.*

(Continued)

*Primary Examiner* — Van H Nguyen
(74) *Attorney, Agent, or Firm* — Dennis Jung, Esq.; Kevin P. Radigan, Esq.; Heslin Rothenberg Farley & Mesiti P.C.

(57) ABSTRACT

A facility is provided for communicating among processes in a symmetric multi-processing (SMP) cluster environment wherein at least some SMP nodes of the SMP cluster include multiple processes. The facility includes transferring intra-nodal at an SMP node messages of a collective communication among processes employing a shared memory of the SMP node; and responsive to the intra-nodal transferring, concurrently transferring inter-nodal multiple messages of the collective communication from n SMP node(s) to m other SMP node(s), wherein at least one of n or m is greater than one. The concurrently transferring is performed by multiple processes of at least one of the n SMP node(s) or the m other SMP node(s). More particularly, the facility includes concurrently transferring inter-nodal the multiple messages from one of: one SMP node to multiple other SMP nodes, multiple SMP nodes to one other SMP node, or multiple SMP nodes to multiple other SMP nodes.

21 Claims, 9 Drawing Sheets

U.S. PATENT DOCUMENTS

| | | | |
|---|---|---|---|
| 6,886,031 B2* | 4/2005 | Venkatsubramanian et al. | 709/213 |
| 6,970,982 B2* | 11/2005 | Altman et al. | 711/141 |
| 6,990,559 B2* | 1/2006 | Van Doren et al. | 711/141 |
| 7,149,852 B2* | 12/2006 | Van Doren et al. | 711/141 |
| 7,370,156 B1* | 5/2008 | Nguyen et al. | 711/147 |
| 7,539,989 B2* | 5/2009 | Blackmore et al. | 718/100 |
| 7,634,477 B2* | 12/2009 | Hinshaw | 1/1 |
| 2002/0009095 A1* | 1/2002 | Van Doren et al. | 370/432 |
| 2002/0083243 A1 | 6/2002 | Van Huben et al. | 710/107 |
| 2002/0083299 A1 | 6/2002 | Van Huben et al. | 712/29 |
| 2002/0147785 A1 | 10/2002 | Narayan et al. | |

OTHER PUBLICATIONS

He et al. "MPI and Openmp Paradigms On Cluster Of SMP Architectures: The Vacancy Tracking Algorithm for Multi-Dimensional Array Transposition", 2002 IEEE, pp. 1-14.*

Geoffray et al. "BIP-SMP: High Performance Message Passing Over A Cluster Of Commodity SMPs", 1999 ACM, pp. 1-19.*

Barak et al. "Scalable Cluster Computing With MOSIX for Linux", 1999, 8 pages.*

Wu et al., "Optimizing Collective Communications on SMP Clusters", Proceedings of the 2005 Int'l. Conference on Parallel Processing Jun. 14-17, 2005 (XP-002418707).

Wu et al., "A Tunable Collective Communication Framework on a Cluster of SMPs", Parallel and Distributed Computing and Networks (2004) (XP-002418708).

Tipparaju et al., "Fast Collective Operations Using Shared and Remote Memory Access Protocols on Clusters", Parallel and Distributed Processing Symposium, IEEEE Proceedings, pp. 84-93 (Apr. 22, 2003).

Notification of Transmittal of the International Search Report and the Written Opinion of the International Searching Authority, or the Declaration, International Application No. PCT/EP2006/067761, filed Oct. 25, 2006.

Chinese Office Action issued for Chinese Patent Publication No. 2006-800411835, dated Feb. 12, 2010.

Sistare et al., "Optimizing of MPI Collectives on Clusters of Large-Scale SMP's", Sun Microsystems, Inc., Portland, Oregon, ACM 1-58113-091 (Nov. 13, 1999).

Wu et al., "Optimizing Collective Communication on SMP Clusters", IEEE, Proceedings of the 2005 International Conference on Parllel Processing (ICPP'05) (Jun. 17, 2005).

IBM Parallel Environment for AIX 5L: MPI Subroutine Reference, Version 4, Release 2, Modification 1 (Aug. 2005).

Intel MPI Benchmark 2.3, "Users Guide and Methodology Description", (http://www.intel.com/cd/software/products/asmo-na/eng/cluster/mpi/219847.htm) (2004).

J. Tyler et al., "AltiVec™: Bringing Vector Technology to the PowerPC™ Processor Family", IEEE, pp. 437-444 (1999).

"Optimization of MPI Collectives on Clusters of Large-Scale SMPs", Supercomputing (1999).

* cited by examiner

METHOD, SYSTEM AND PROGRAM PRODUCT FOR COMMUNICATING AMONG PROCESSES IN A SYMMETRIC MULTI-PROCESSING CLUSTER ENVIRONMENT

TECHNICAL FIELD

This invention relates in general to message handling, and more particularly, to a method, system and program product for communicating messages of a collective communication among processes in a symmetric multi-processing (SMP) cluster environment.

BACKGROUND OF THE INVENTION

A symmetric multi-processor (SMP) refers to an aspect of hardware in a computing system, and more particularly, relates to the physical layout and design of the processor planar itself. Such multiple processor units have, as one characteristic, the sharing of global memory as well as equal access to input/output (I/O) of the SMP system. An SMP cluster refers to an environment wherein multiple SMP systems/nodes are coupled together for parallel computing. SMP clusters continue to become more popular, and are now widely deployed in the area of scientific and engineering parallel computing. These cluster environments typically include hundreds of SMP nodes connected by low latency, high bandwidth switch networks, such as the High Performance Switch (HPS) offered by International Business Machines (IBM) Corporation of Armonk, N.Y. Each SMP node has, for example, two to sixty-four CPUs and often has more than one switch adapter to bridge the gap between switch and single adapter capability. For instance, two switch adapters can be installed on an IBM eServer pSeries 655, which has eight IBM Power4 CPUs.

As further background, the message passing interface (MPI) standard defines the following schematic: that processes in a parallel job exchange messages within a communication domain (or "communicator") which guarantees the integrity of messages within that domain. Messages issued in one domain do not interfere with messages issued in another. Once a parallel job begins, subsets of the processes may collaborate to form separate communication domains as needed.

The MPI standard defines a set of collective communication operations. Some of the MPI collectives are "rooted", meaning that either the source or the sink of the message is only one MPI process. These collectives are for one-to-many or many-to-one communication patterns. The most often used are MPI_Bcast and MPI_Reduce. Non-rooted collectives, such as MPI_Barrier, MPI_Allreduce and MPI_Alltoall are for many-to-many communication patterns.

On SMP clusters, the collectives (e.g., occurring within the context of MPI communicators) usually follow a hierarchical message distribution model to take advantage of the fast shared memory communication channel on each SMP node. With the fast development of switch technology, however, a single MPI process often cannot fully utilize the available switch network capacity. Stripping techniques have been used to achieve higher bandwidth than one adapter can deliver, but do not help meet latency requirements.

Thus, a new communication approach for collectives of an SMP cluster environment is desirable wherein the switch/adapter capacity is fully utilized, and shared memory facilitates the inter-SMP communication portion of the collective operations.

SUMMARY OF THE INVENTION

The shortcomings of the prior art are overcome and additional advantages are provided through the provision of a method of communication among processes in a symmetric multi-processing (SMP) cluster environment, wherein at least some SMP nodes of the SMP cluster include multiple processes. The method includes: (i) transferring intra-nodal at an SMP node messages of a collective communication among processes employing a shared memory of the SMP node; and (ii) responsive to the transferring (i), concurrently transferring inter-nodal multiple messages of the collective communication from n SMP node(s) to m other SMP node(s), wherein at least one of n or m is greater than one, and wherein the concurrently transferring is performed by multiple processes of at least one of the n SMP node(s) or the m other SMP node(s).

In enhanced aspects, the concurrently transferring (ii) includes concurrently transferring inter-nodal the multiple messages from one of: one SMP node to multiple other SMP nodes, multiple SMP nodes to one other SMP node, or multiple SMP nodes to multiple other SMP nodes. Multiple communication channels of the at least one SMP node or the at least one other SMP node are employed for facilitating the multiple processes' performing of the concurrently transferring. Further, the SMP nodes and processes involved in the transferring (i) and the concurrently transferring (ii) can be defined at creation time of the communicator employed.

In another aspect, a system for communicating among processes in a symmetric multi-processing (SMP) cluster environment is provided, wherein at least some SMP nodes of the SMP cluster include multiple processes. The system includes means for transferring intra-nodal at an SMP node messages of a collective communication among processes employing a shared memory of the SMP node; and means for concurrently transferring inter-nodal, responsive to the intra-nodal transferring, multiple messages of the collective communication from n SMP node(s) to m other SMP node(s) wherein at least one of n or m is greater than one, and the concurrently transferring is performed by multiple processes of at least one of the at least one SMP node or the at least one other SMP node.

In a further aspect, at least one program storage device readable by at least one computer, tangibly embodying at least one program of instructions executable by the at least one computer to perform a method of communicating among processes in a symmetric multi-processing (SMP) cluster environment is provided. At least some SMP nodes of the SMP cluster include multiple processes. The method includes: transferring intra-nodal at an SMP node messages of a collective communication among processes employing a shared memory of the SMP node; and responsive to the intra-nodal transferring, concurrently transferring inter-nodal multiple messages of the collective communication from n SMP node(s) to m other SMP node(s), wherein at least one of n or m is greater than one, and the concurrently transferring is performed by multiple processes of at least one of the n SMP node(s) or the m other SMP node(s).

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, provided herein is a novel communication approach for transferring messages of a collective communication among processes in a symmetric multi-processing (SMP) cluster environment. At least some SMP nodes of the SMP cluster include multiple processes. The technique includes initially transferring intra-nodal at an SMP node messages of the collective communication among processes. This intra-nodal transfer of messages is accomplished employing a shared memory of the SMP node. For example, during a broadcast operation, a root process of the SMP node may store a message to the shared memory, which may then be accessed by multiple other processes of the SMP node. Responsive to the intra-nodal transferring, the communication approach then provides for concurrent transferring inter-nodal of multiple messages of the collective communication from n SMP node(s) to m other SMP node(s), wherein at least one of n or m is greater than one. This concurrent transfer is performed by multiple processes of either the n SMP node(s) or multiple processes of the m other SMP node(s). Although described herein below with reference to a broadcast operation, those skilled in the art will note that the communications approach presented is readily applicable to other collective communications, both rooted and non-rooted.

Figure 1:
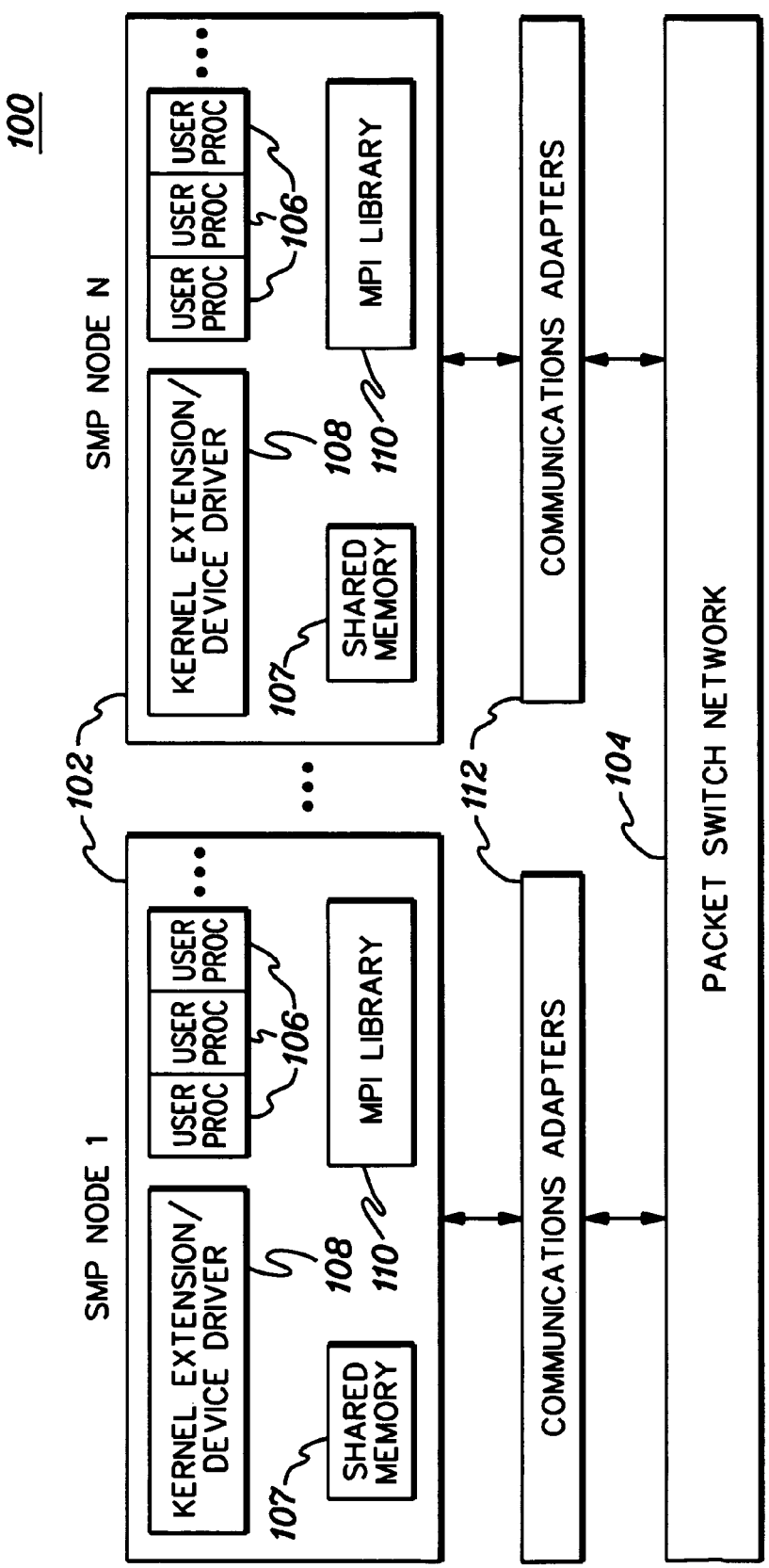
FIG. 1 depicts one embodiment of a symmetric multi-processing (SMP) cluster environment incorporating and using one or more aspects of the present invention.

One embodiment of a processing environment incorporating and using one or more aspects of the present invention is depicted in FIG. 1. In this particular example, processing environment 100 includes a plurality of computing or processing nodes 102, such as a pSeries server offered by International Business Machines Corporation, coupled together by a connection 104, which may be a packet switch network, such as the SP switch or High Performance Switch (HPS), also offered by International Business Machines Corporation. Note again, FIG. 1 is presented by way of example only. Within each processing node, a plurality of processors are provided running multiple user processes 106. These processors are coupled to one another via low latency, high bandwidth connections and managed by an operating system, such as AIX or LINUX, offered by International Business Machines Corporation, to provide symmetric multi-processing (SMP). The multi-processing is enabled, in one example, by using multiple processing threads, each thread executing on a processor. Further, in one embodiment, one or more of the processors may provide multi-threading itself. That is, one or more of the processors may be capable of executing, in this example, two threads. In other examples, one or more of the processors can execute any number of threads.

Within environment 100, message packets or messages are transferred intra-nodal (i.e., within SMP nodes) employing shared memory 107. One or more processes 106 of the SMP node may store a message to the shared memory, which may then be accessed by one or more other processes of the SMP node. Messages are transferred inter-nodal (i.e., between SMP nodes) employing communications adapters 112 coupled to packet switch network 104. Communication between an SMP node and its corresponding communications adapters includes functions for sending and receiving packets. In one embodiment, the interface comprises a message passing interface (MPI) 110, also referred to herein as an MPI library.

Access to the adapters is mediated by a kernel/extension device driver 108 within each SMP node. Extension 108 includes a set of functions that have the authority of the operating system itself (e.g., the AIX operating system offered by International Business Machines Corporation). The kernel/extension authorizes use of one or more adapters 112 by a user process 106 and has the capability of interrupting the user process, if desired. User process 106 communicates with adapter 112 through the MPI library 110. The MPI library is described in greater detail in, for example, an International Business Machines Corporation publication entitled "IBM Parallel Environment for AIX 5L: MPI Subroutine Reference", Version 4, Release 2, Modification 1 (August, 2005), the entirety of which is hereby incorporated herein by reference.

As used herein a "parallel job" is a set of processes or tasks executing on a collection of processors. The processes cooperate and exchange data in order to solve a problem jointly. A "task" or "process" is an instance of an executing program (sequence of instructions), including an address space in one or more flows of control. An "address space" is the set of memory locations that a process may reference or access. An "MPI communicator" is a logical entity comprising a group of communicating processes. In one example, a communicator can be implemented with an identifier called a context ID. A "communication domain" is the context in which the processes comprising a communicator exchange messages. It has the properties of stability and insularity, in that no message sent within the domain will be delivered to a process outside the domain (i.e., in a different communicator). "Communication domain" and "communicator" are used interchangeably herein. A "collective communication" is an operation in which every member of the communicator must participate.

Although described herein with reference to an MPI collective operation, such as the MPI_Bcast operation, the concepts presented are readily applicable to transferring messages of any collective communication among processes in a symmetric multi-processing (SMP) cluster environment, which by definition includes shared memory at each SMP node. Presented herein is a new shared memory message communication approach for collectives on SMP nodes. This new approach allows for multiple concurrent inter-SMP communications. With this concurrent communication approach, the switch/adapter capacity is more fully utilized and use of shared memory also facilitates the inter-SMP communication portion of the collective operation.

On switch networks, an MPI collective operation is commonly mapped to a series of point-to-point send/receive communications. The point-to-point messages are transferred via switch links following a certain order and topology. MPI_Bcast implementations often use one type of tree algorithm for optimal performance when a message is not very large. The root of the MPI_Bcast is the root process of the tree. Binary, binomial and other alpha trees are among the most often used. The time needed for the message to reach every task is roughly:

$$T = H \cdot (L + O) \qquad [1]$$

where L is the time for transferring the message from one node to another node through the switch link. O is the time for an MPI process to prepare the message and provide it to the switch for transfer, and H is the height of the tree. Usually $H = \log_2 N$, where N is the number of nodes of the tree (number of MPI processes participating in the MPI_Bcast operation). The base of the logarithm reflects the relationship between L and O, where O is close to L, the optimal performance can be achieved with base two. If O is much smaller, then the base can be greater than two and the height of the tree will be reduced. In this case, the process works on the next message as soon as the current one is out on its way. With a very small O, messages would be dispatched in such rapid succession that the serialization would be harmless. In another network example, O is closer to L, so multiple processes of the parent are used to remove the serialization and still adopt a Log base greater than 2.

Figure 2:
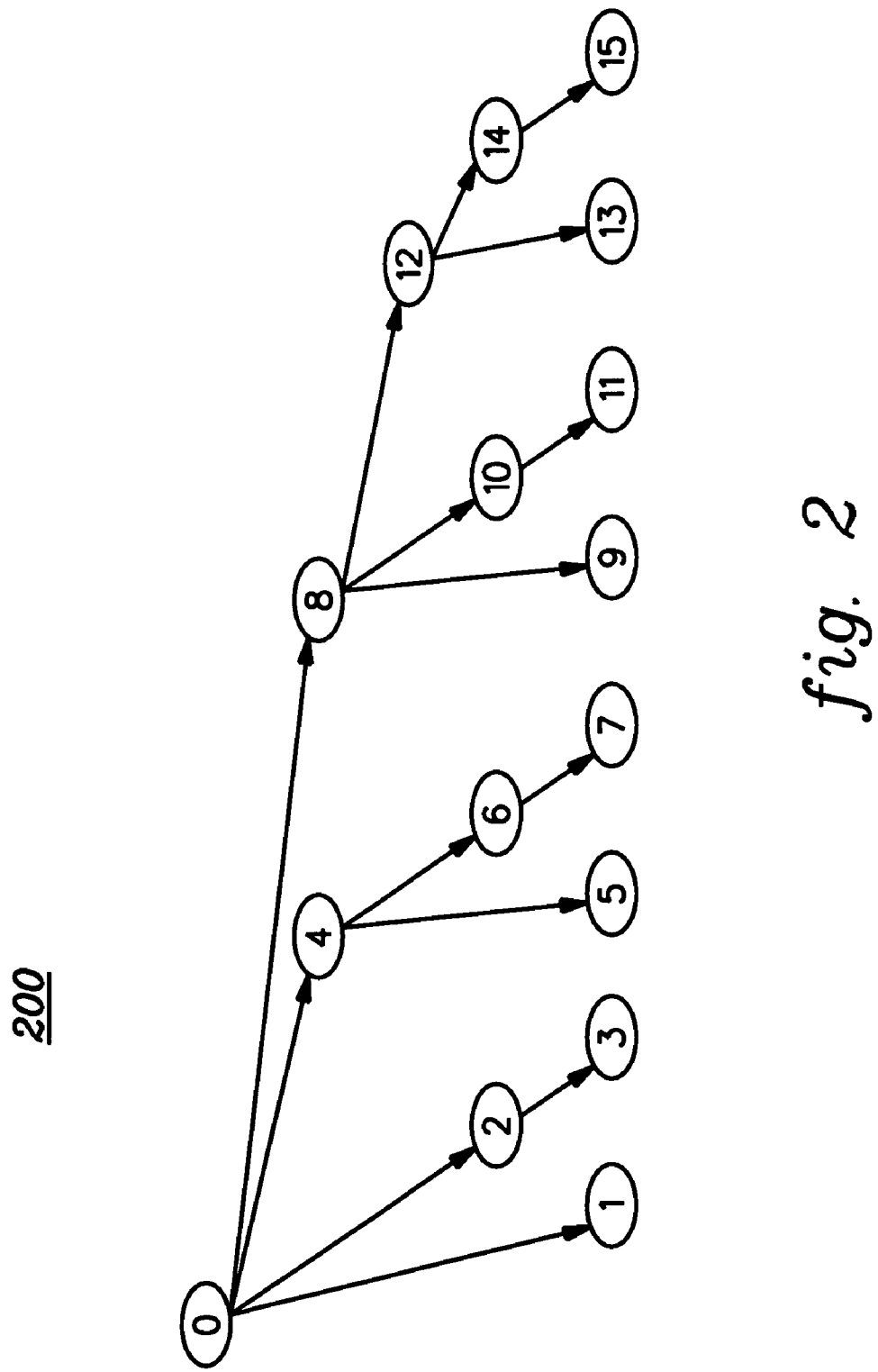
FIG. 2 depicts one communication approach for an MPI_Bcast employing a conventional binomial tree for distribution of messages among processes, either in an SMP environment or a non-SMP environment.

FIG. 2 shows an example of a binomial tree MPI_Bcast operation, generally denoted 200. Arrows represent message transfers. There are sixteen MPI processes (labeled 0 through 15) in the MPI_Bcast and process 0 is the root. The height of the tree is four.

On a cluster of single processor computers, the above-described communications algorithm works well. However, on SMP clusters, this algorithm is often not optimal without further enhancements. The reason for this is that there are two different communication channels in SMP clusters with different performance characteristics; i.e., the shared memory and the adapter switch. Shared memory is faster than the switch. The time of an MPI_Bcast on SMP clusters using the above algorithm is:

$$T = H_1 \cdot (L_1 + O) + H_2 \cdot (L_2 + O) \qquad [2]$$

where: $H_1 = \log_2 N$, and N is the number of SMP nodes in the cluster, [2.1]

$L_1$ = the switch latency, $H_2 = \log_2 M$, where M is the number of MPI processes on each SMP node, [2.2]

$L_2$ = the share memory latency.

Figure 3:
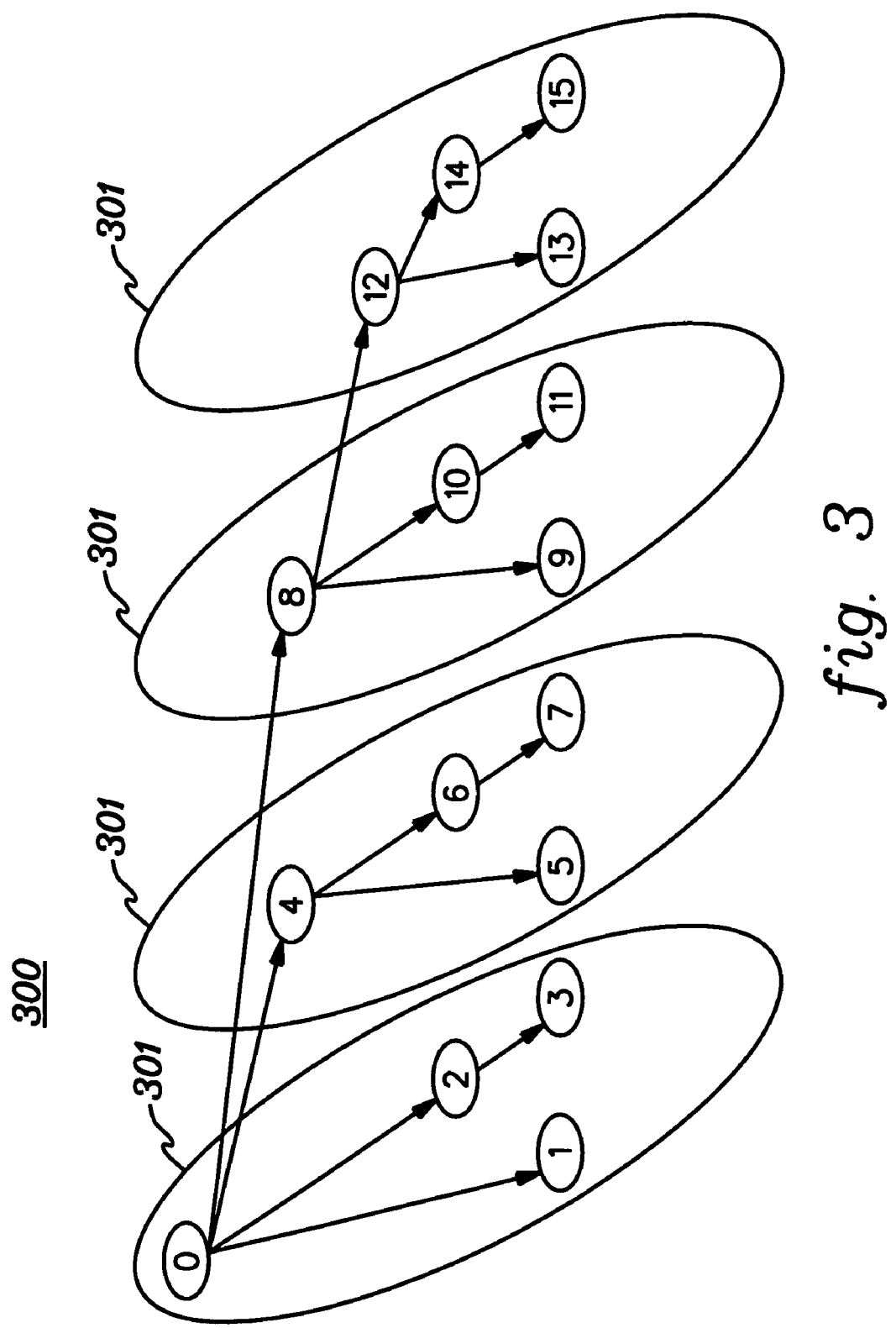
FIG. 3 depicts another communication approach employing a binomial tree within an SMP cluster environment for distribution of an MPI_Bcast message.

FIG. 3 depicts one example of an MPI_Bcast operation 300 running on an SMP cluster environment having four SMP nodes 301, with four processes or tasks on each SMP node for a total number of processes of sixteen (again labeled 0 through 15). Using the above algorithm, N=4, M=4, $H_1$=2, and $H_2$=2.

Enhanced communication algorithms have been developed for SMP cluster environments. These communication algorithms follow a hierarchical model where shared memory is used within an SMP and one MPI process per SMP participates in the inter-SMP communication on behalf of itself and all other MPI processes on the SMP. This allows for different optimizations for the intra-SMP portion and the inter-SMP portion of the collectives. Shared memory is exploited at the collective operation level in this approach, instead of the point-to-point level. For example, in MPI_Bcast a process is selected per SMP node as representative of the processes on the SMP node. The root process is representative on its SMP node which is called the root SMP node. In the SMP cluster environment communications example of FIG. 4, the left-most SMP node 401 is the root SMP node. The representatives first perform MPI_Bcast among themselves through inter-SMP communication (e.g., message communication between process 0 and process 8, process 8 and process 12, and process 0 and process 4). Once the inter-SMP communication is completed, the message received at every SMP node is then copied from the representative's buffer to a shared memory buffer and other processes on the same SMP node then concurrently copy the data from the shared memory buffer. The shared memory buffer is accessible to all processes on the node, hence the base of the logarithm can be M in equation (2.2), and the intra-SMP sub-trees become flat. This reduces time taken to:

$$T = H_1 \cdot (L_1 + O) + (L_2 + O) \qquad [3]$$

Figure 4:
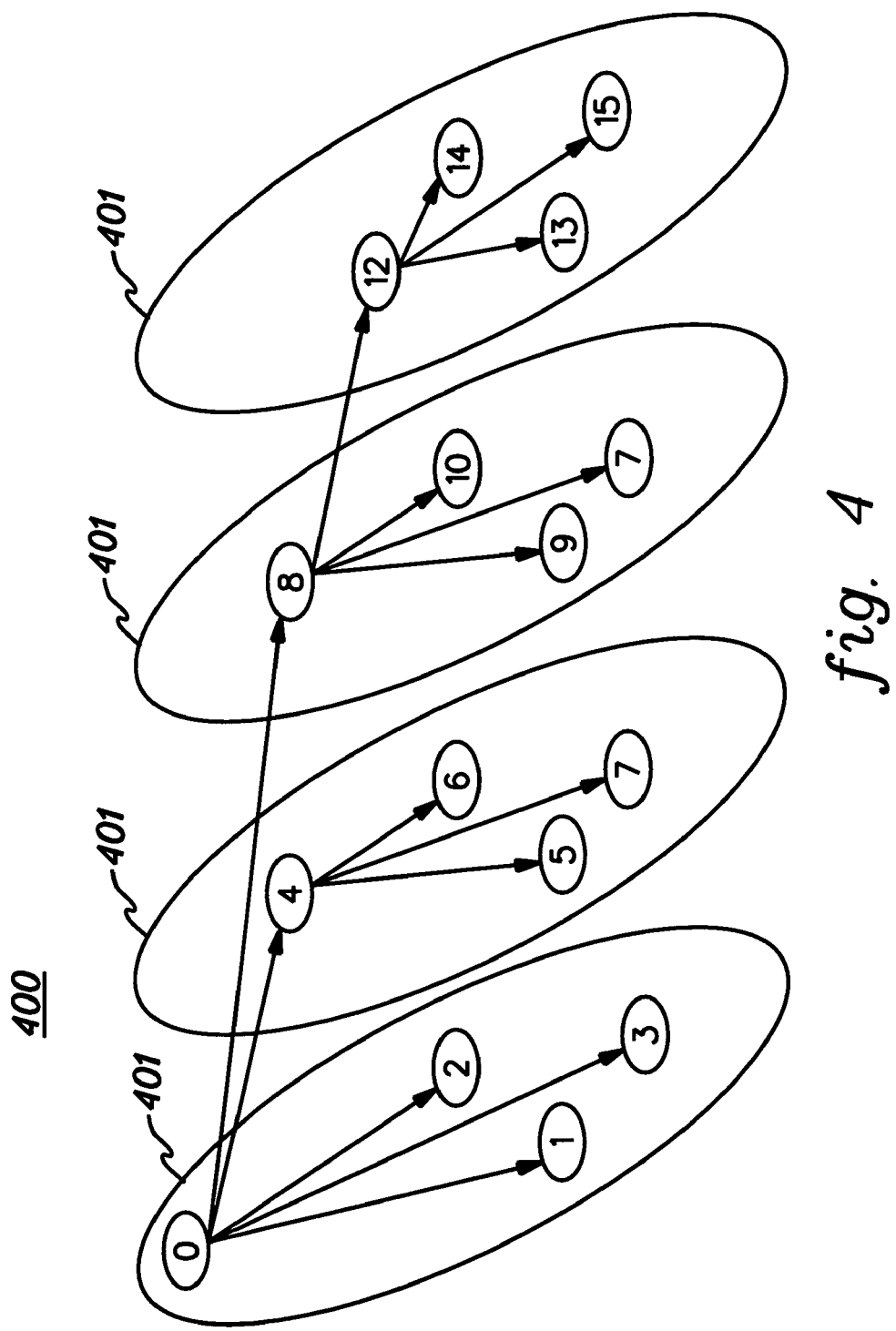
FIG. 4 depicts still another communication approach employing a binomial tree distribution of messages inter-SMP nodal and collective level shared memory intra-SMP for distribution of an MPI_Bcast message.

FIG. 4 shows MPI_Bcast being carried out using this communication approach 400 in the same SMP cluster environment example of FIG. 3. The difference is that the message transferring through shared memory is carried out simultaneously by multiple processes. The inter-SMP communication portion remains the same.

When the message to be broadcast is large, it can be split into smaller portions and broadcasted one-by-one using the same approach. Other communication algorithms also exist. For example, the root of the MPI_Bcast can split the message into small portions and send each non-root process a distinct portion. Then, all processes perform MPI_Allgather to complete the message. Nevertheless, a common approach is taken when applying these communication algorithms on SMP clusters; that is, one process per SMP node participates in the inter-SMP communication. Various shared memory optimizations in the prior art focus only on the intra-SMP portion of the collective operation. For larger SMP clusters, the inter-SMP portion of the communication dominates the overall performance, and the speed-up effect from the above-noted shared memory optimization is limited.

Thus, presented herein is a novel approach to collective communications on SMP clusters that can significantly improve performance. This approach, referred to as a concurrent communications approach, benefits from concurrency in both the shared memory communication within the SMP nodes, and concurrency in inter-SMP switch communications. The communication approach improves small message collectives most, and if there is enough adapter and network capacity onto/off of each SMP node, then the benefits extend to large messages as well.

Contemporary switch technologies provide more bandwidth capacity than a single process can fully utilize and may allow multiple tasks on the node to use the adapter and switch concurrently without significant performance lost per process. Letting only one process drive the inter-SMP communication limits the overall performance for collectives in comparison to the capability of the adapters and switch. The concurrent communication approach improves inter-SMP communication performance by not funneling through a single process and forgoing full adapter/switch capacity. This is possible with the help of shared memory optimizations. The concurrent approach also includes intra-SMP and inter-SMP stages. In the intra-SMP stage, share memory optimization is performed at the collective level. In the inter-SMP communication, more than one MPI process (every process if necessary) per SMP accesses the switch network to participate in transferring messages. Therefore, the base of the logarithm in equation [2.1] increases and can be as large as M. The tree is flatter and overall performance improves, in particular for larger SMP node counts.

Again, using MPI_Bcast as an example, the steps involved in the concurrent communication algorithm are:

(1) Representatives on non-root SMP nodes are responsible for receiving messages from other SMP nodes. This is because there will only be one message sent to each SMP in the MPI_Bcast. It is by no means a limitation on how many processes participate in inter-SMP communication. In fact, multiple processes per SMP concurrently send messages to other SMP nodes in MPI_Bcast and multiple processes per SMP concurrently receive messages in MPI_Reduce. In some non-rooted collectives such as MPI_Barrier and MPI_Allgather, multiple processes per SMP participate in both send and receive.

(2) Based on process layout knowledge gathered during the MPI communicator creation and cached at each process, the SMP nodes can be organized into a tree of height $Log_m N$, where N is the number of the SMP nodes in the cluster and m is the number of the MPI processes per SMP chosen to participate in the inter-SMP communication. An m-ary tree is one of the $Log_m N$ tree examples, in which each non-leaf node has m children node. Every process calculates its parent SMP and children SMP based on the position of the SMP it belongs to.

(3) Intra-SMP Bcast through collective level share memory on the root SMP. The time taken in this step is $L_2 + O$.

(4) M processes on the root SMP start inter-SMP broadcast in a loop. In each of the iterations, the message is sent to m children SMP nodes. Sending messages to the m children SMP nodes is done concurrently by the m processes of the root SMP. The $i^{th}$ process on the root SMP sends the message to the representative on the $(m \cdot j + i)^{th}$ child SMP node in the $j^{th}$ iteration. Where $0 < i <= m$, $0 <= j < Log_m N$. The time needed for each iteration is $L_1' + O$. $L_1'$ could be higher than $L_1$ since there are multiple processes accessing the switches/adapters concurrently. But $L_1'$ should be much less than $L_1 \cdot m$ since modern switch adapters allow multiple concurrent accesses without serializing them.

(5) On non-root SMP nodes, the representative waits for the message and other processes await the intra-SMP Bcast. Once the representative receives the message, it joins the intra-SMP Bcast and passes the message to other processes through collective level share memory. To overlap the inter-SMP communication with the shared memory intra-node Bcast(s), the representative processes can receive the message directly into the shared memory buffer first. Once the receive is complete, all m processes on this SMP can start forwarding the message to children SMP nodes using the shared memory buffer as the send buffer for the inter-SMP communication. After the messages are on their way to children SMP nodes, these processes can copy messages from the shared memory buffer to their own user-specified receive buffers.

(6) After the intra-SMP Bcast, if the non-root SMP is not a leaf of the tree, m processes on the SMP enter a loop similar to step (4) and send messages to representatives on children SMP nodes.

Since in each of the iterations, the number of SMP nodes the message reaches multiplies by m, the number of iterations any process takes is at most $Log_m N$.

Figure 5:
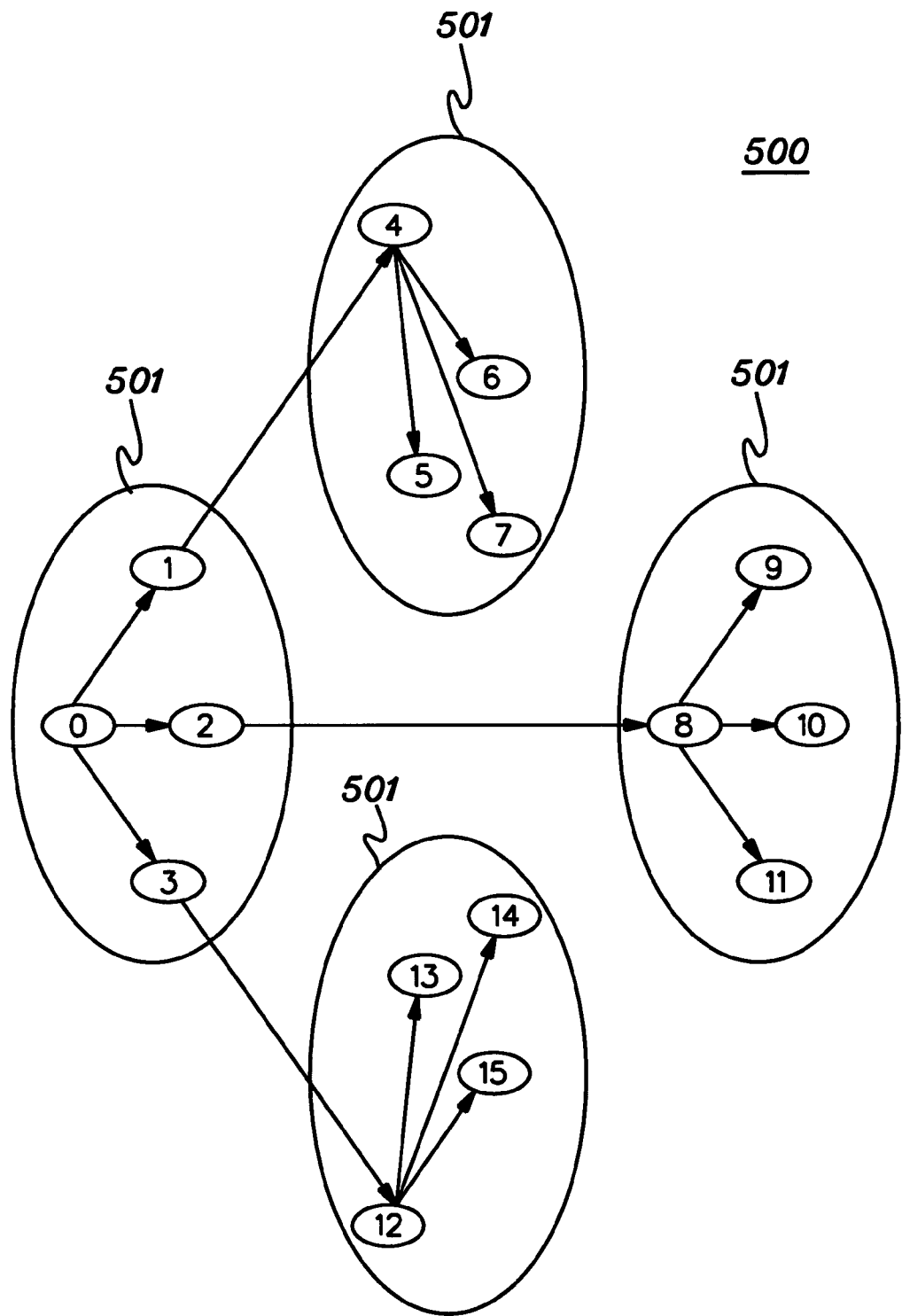
FIG. 5 depicts one embodiment of a concurrent communication approach for transfer of MPI_Bcast messages intra-SMP nodal followed by concurrent inter-SMP nodal transfer of messages, in accordance with an aspect of the present invention.

FIG. 5 shows MPI_Bcast running in an SMP cluster 500 having multiple nodes 501, and employing the above-outlined concurrent communication algorithm. In this example, process 0, 4, 8, 12 are the selected representatives. m=3. The inter-SMP communications are done concurrently so the time for inter-node SMP transfer is only $L_1 + O$. Whereas in FIG. 4, $2 \cdot (L_1 + O)$ is needed for inter-SMP communication. More concurrency is achieved since the concurrent communication approach is not limited by one process' ability of sending out messages. This leads to better adapter/switch utilization.

Pseudo code for the generalized algorithm is listed below. This pseudo code assumes process 0 is the root and processes are distributed evenly on SMP nodes:

rank: rank of this process,
srank: rank of the SMP this process is on,
size: total number of processes,
ssize: total number of SMP nodes,
psize: number of processes per SMP, and
prank: rank of this process within the SMP
base: number of processes per SMP participating inter-SMP communication.

MPI_Bcast
  if this task is non-root representative
    for Cur=1 to ssize, cur multiply by (base+1) each time
      if srank is less than Cur·(base+1))
        source process rank is ((srank−cur)/base)·psize+
        ((srank−cur) mod base)
        receive message from source process
        break
  intra-SMP Bcast through collective shared memory
  if prank is less than base
    for Cur=Cur·(base+1) to ssize, Cur multiply by (base+1) each time
      destination process rank is (Cur+srank·base+prank) ·psize if the destination process rank is less than size
      send message to destination As described above, the time needed for the message to reach every process using this algorithm is:

$$T = H_1' \cdot ((L_1' + O) + (L_2 + O)) + (L_2 + O) \quad [4]$$

where $H_1'$ is the height of the flatter tree and $H_1' = Log_m N$. The right-most item is the cost of step (3). Comparing equation [4] to equation [3], there is extra time spent on intra-SMP per level of the tree but less time spent in the inter-SMP communication since the height of the tree is reduced. As long as the chosen value of m satisfies the following:

$$H_1 \cdot (L_1+O) = H_1' \cdot (L_1'+O) > H_1' \cdot (L_2+O) \quad [5]$$

the overall performance will be improved. Usually, the shared memory latency is much less than the switch latency $L_1$, and the above-noted condition is not hard to achieve. When m equals 1, the algorithm reduces to the prior algorithm. One the other hand, the chosen m does not have to be less than the number of processes per SMP and simple modification can support that.

Figure 7:
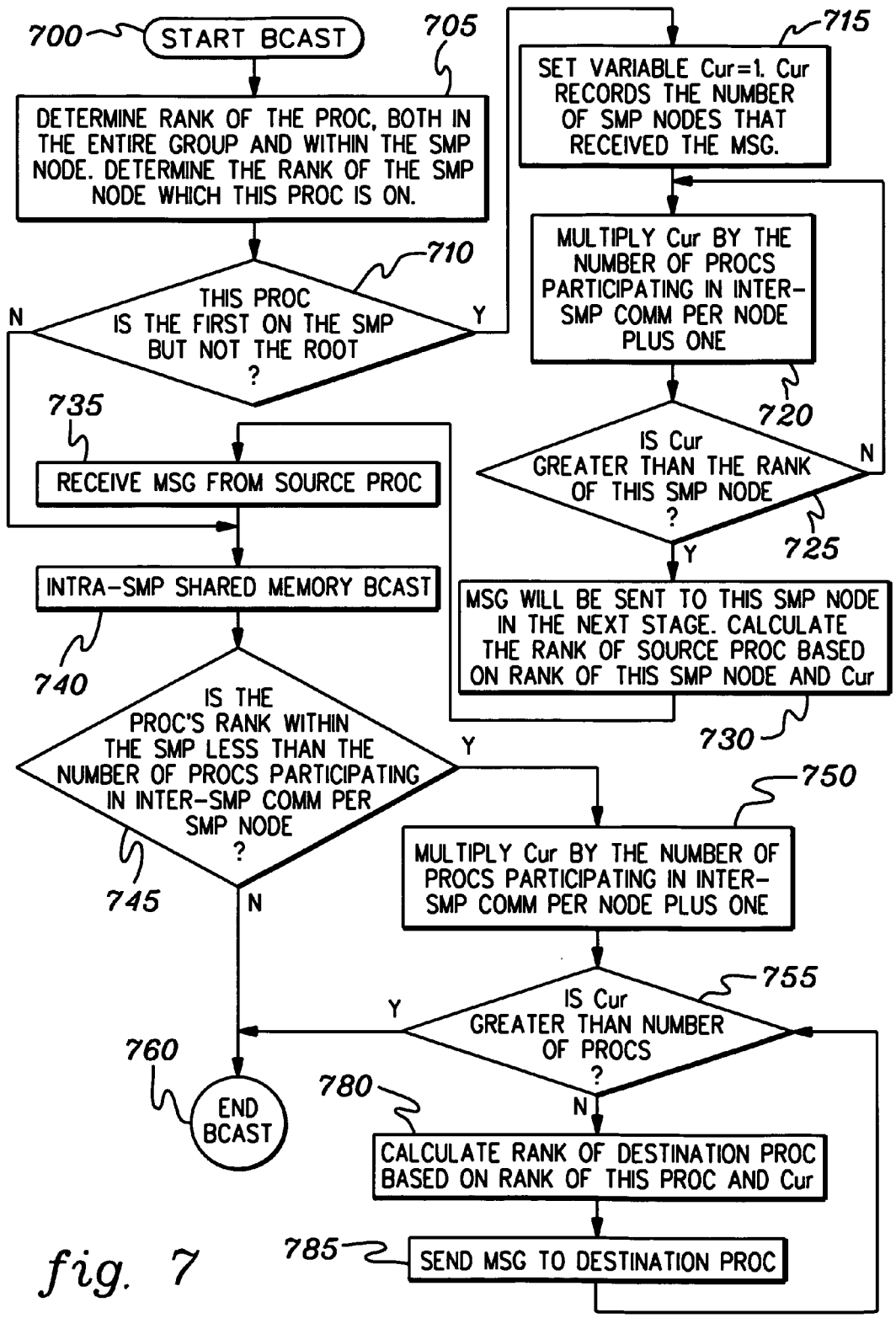
FIG. 7 is a flowchart of one embodiment of a communication approach for transferring concurrent an MPI_Bcast message, in accordance with an aspect of the present invention.

FIG. 7 is a flowchart of one embodiment for concurrent communicating among processes of a collective in a symmetric multi-processing cluster environment. The collective communication is (in one example) an MPI_Bcast. Each process in the collective implements the communicating approach of this figure. The process begins 700 by determining a rank of the process both in the entire collective (i.e., group of processes) and within the SMP node where the user process is running 705. Further, the rank of the SMP node that the process is on is determined. The approach then determines whether the process is a first process on the SMP node, but not a root process 710. Assuming that the process is the first process on the SMP node, but not the root process, then a variable "Cur" is set to one 715. Cur records the number of SMP nodes that received the message. Next, the variable Cur is multiplied by the number of processes participating in inter-SMP communication per SMP node, plus one 720. The approach determines whether the variable Cur is then greater than the rank of the SMP node that the process is on 725. If "no", then the variable Cur is again multiplied by the number of processes participating in the inter-SMP communication per node, plus one.

Once the variable Cur is greater than the rank of the process' SMP node, then messages are sent to the SMP nodes in the next stage. The rank of the source process based on the rank of this SMP node and the variable Cur is calculated 730. Each transferred message is then received from the source process 735.

If the process is other than the first process on the SMP node, or is the root process, or if this is a receive process, then intra-SMP shared memory broadcast is performed 740. The communication approach determines whether the processor's rank within the SMP is less than the number of processors participating in the inter-SMP communication per SMP node 745. If so, then the broadcast communication is complete 760. Otherwise, the approach multiplies the variable Cur by the number of processes participating in inter-SMP communication per node, plus one, 750, and inquires whether the variable Cur is greater than the number of processes 755. If so, the communication approach is complete 760. Otherwise, the rank of the destination process is calculated based on the rank of this process and the variable Cur 780, and the message is sent to the destination process 785. Thereafter, the approach determines whether the variable Cur is greater than the number of processes 755, and once so, processing is complete.

Figure 8:
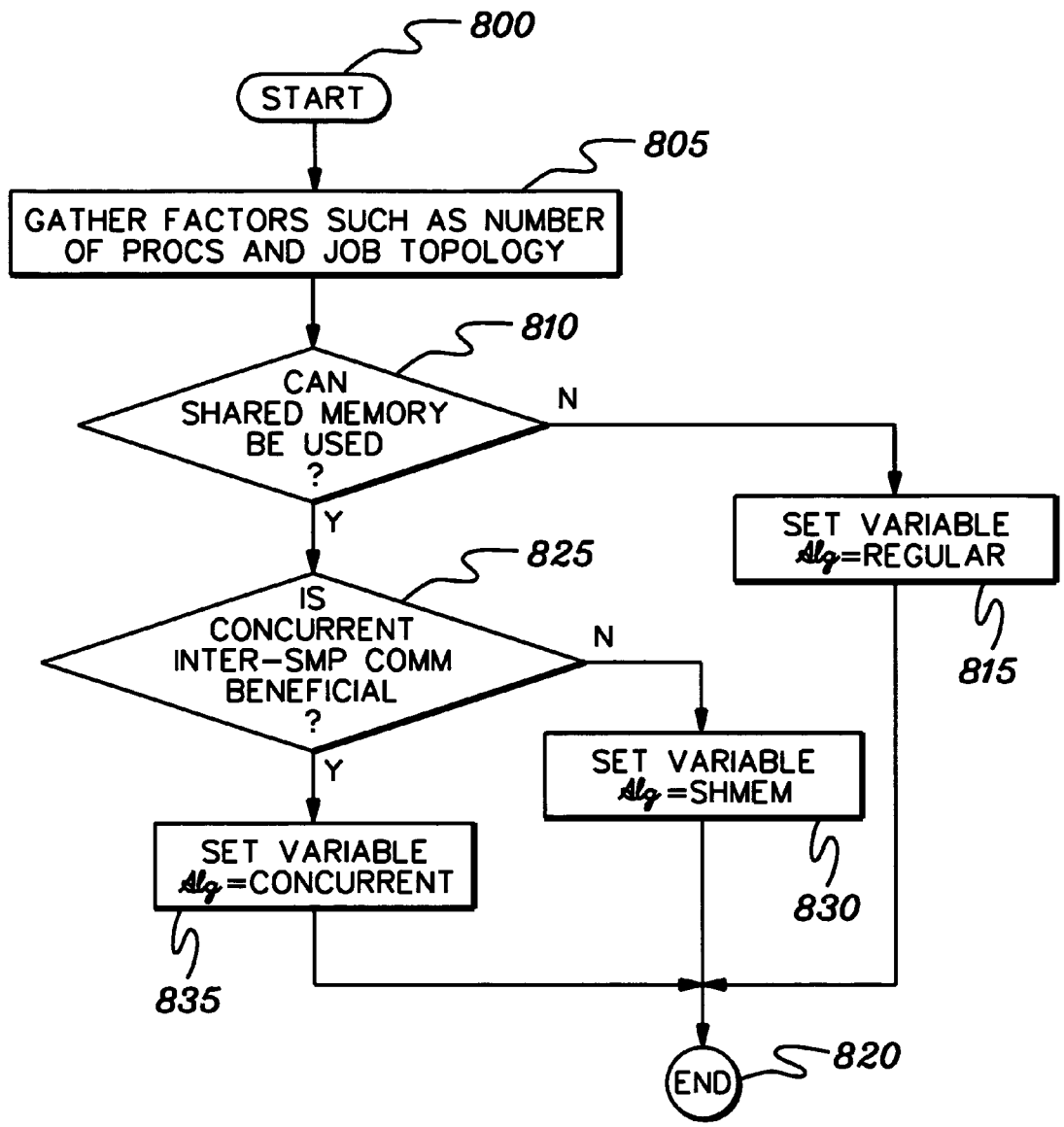
FIG. 8 is a flowchart of one embodiment for determining selection of a communications algorithm at communicator creation time, in accordance with an aspect of the present invention.

FIG. 8 depicts one approach for setting a communication algorithm at communicator creation time. Again, a communicator is an abstraction representing a set of processes which are able to communicate among themselves. Each process is given a handle by which to identify the communicator and an assigned rank within that communicator. The creation of a communicator is done in a collective operation in which every process that will be a member of the new communicator must participate. Once a communicator is created, neither the number of members in the communicator nor the rank assigned to each process can be changed. All communication is specified in the context of some communicator, as when process 0 of MPI_COMM_WORLD does an MPI_Send to rank 1 of MPI_OMM_WORLD, and process 1 of MPI_COMM_WORLD does an MPI_Recv from rank 0 of MPI_COMM_WORLD.

In MPI, every process must call MPI_Init and after the calls to MPI_Init return, each calling process has been provided the communicator called MPI_COMM_WORLD and has been assigned a rank in MPI_COMM_WORLD. Once a communicator (i.e., MPI_COMM_WORLD) is available, additional communicators may be created by operations which utilize a previously existing communicator to do the communication required. In the startup of an MPI job with N processes, the job start framework must create and provide each process with the information it needs to have a usable MPI_COMM_WORLD.

Because new communicator creation is collective among a set of processes that are able to exchange information by using a prior created communicator, the creation process can give each process information about how many processes there will be in the new communicator, which ones are on the each SMP, and assign each process a rank within the SMP it is on. Information about whether each SMP has one process or several and whether each SMP has the same number of processes can be derived. A decision can be made about whether a particular algorithm is suited to the size and layout of the new communicator and every member of the new communicator can record the decision. The simplest example of communicator creation is when all processes call MPI_Comm_dup on MPI_COMM_WORLD and each gets back a handle for a new communicator which mirrors MPI_COMM_WORLD, but is distinct from it. From creation on, each process of a communicator which makes a call such as MPI_Bcast on the communicator can use the communication algorithm which was chosen at creation time and recorded identically at every process.

Thus, referring to FIG. 8, communication algorithm selection begins 800 by gathering factors such as the number of processes in the collective and the job topology 805. Inquiry is made whether shared memory may be used 810. If "no", then the variable Alg is set to "regular", meaning that a regular communications approach such as depicted in FIG. 3 is to be employed. Assuming that shared memory may be used, inquiry is made whether concurrent inter-SMP communication is beneficial 825. If "no", then the variable Alg is set to a "shared memory" (SHMEM) communication approach (such as depicted in FIG. 4) 830. Assuming that concurrent inter-SMP communication is beneficial, then the variable Alg is set to "concurrent" 835, meaning that a communications approach such as depicted in FIG. 5 is to be employed. After the variable Alg is set, algorithm selection is complete 820.

Figure 9:
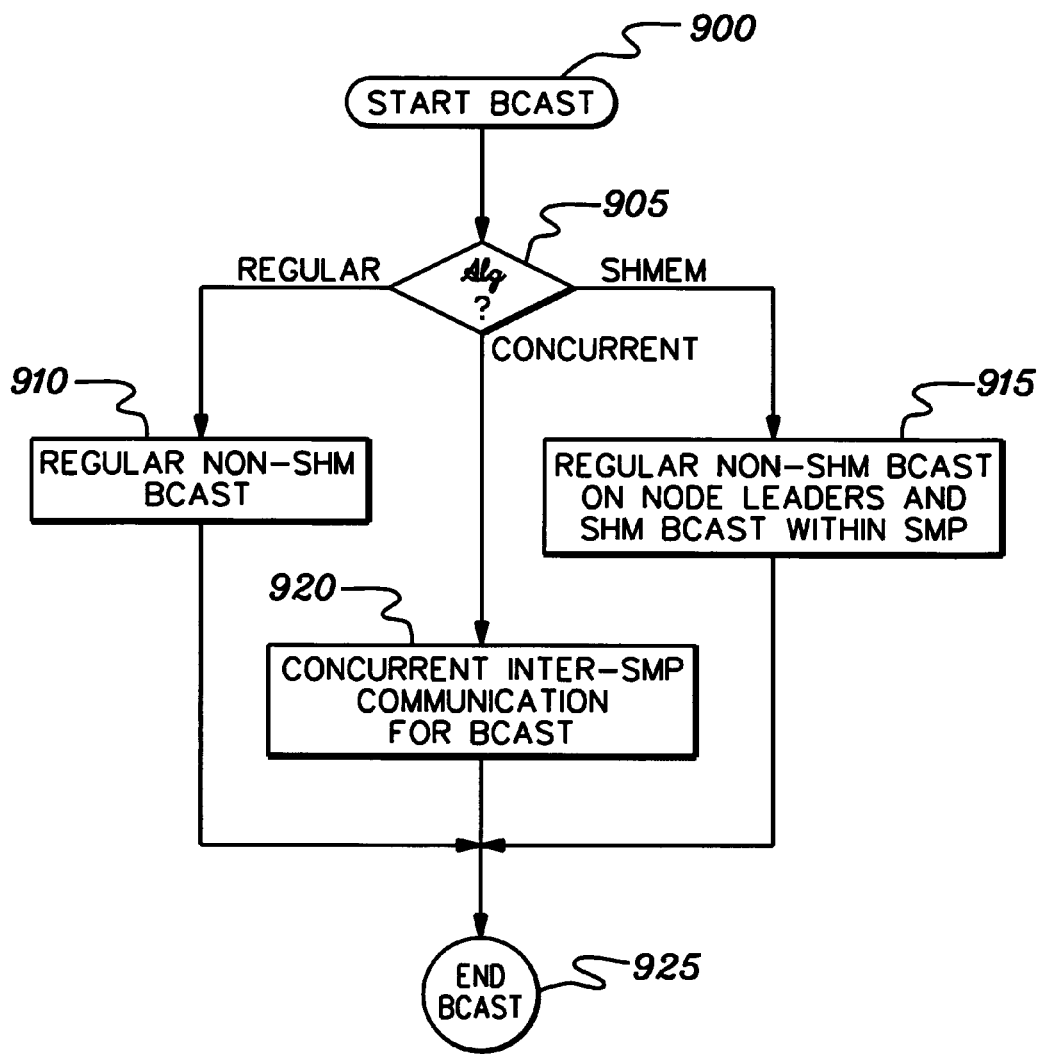
FIG. 9 is a flowchart of one embodiment for ascertaining a communications approach at collective communication time using the communications algorithm selected at communicator creation time, in accordance with an aspect of the present invention.

FIG. 9 depicts one embodiment of an MPI_Bcast operation. The broadcast operation begins 900 by referencing the variable Alg 905 to determine whether the variable has been set to "regular", "SHMEM", or "concurrent". If "regular", then the regular non-shared memory broadcast of, for example, FIG. 3 is employed 910 to complete the broadcast operation 925. Otherwise, if the variable Alg is set to "SHMEM", then the non-shared memory broadcast on node leaders and shared memory broadcast within the SMP node is employed 915, such as depicted in FIG. 4. Still further, if the variable Alg is set to "concurrent", then the concurrent inter-SMP communication for the broadcast operation is employed 920, such as depicted in FIG. 5.

Those skilled in the art will note from the above discussion that the concurrent inter-SMP communication approach described herein can be applied to collective communication operations other than MPI_Bcast on SMP clusters. MPI_Scatter is similar to the MPI_Bcast, except that every non-root process gets a distinct piece of the message.

MPI_Reduce can be implemented by reversing the direction of message transfer in the concurrent inter-SMP communication algorithm for MPI_Bcast. As in MPI_Bcast, there is also one process selected as the representative of the SMP node. The processes on the same child SMP node first carry out intra-SMP reduce operation through shared memory, with the representative process being the root of the intra-SMP reduce operation. Then representatives of multiple SMP nodes send their intermediate reduce results to multiple processes of the parent SMP node through switch network. At each of the multiple processes, the result of the reduce operation on the received message and the local message is used in the shared memory intra-SMP reduce operation, instead of the local message. If messages are concatenated instead of reduced, MPI_Reduce becomes MPI_Gather.

MPI_Allreduce can be implemented by first carrying out MPI_Reduce with process 0 as the root, and then broadcasting the reduce result from process 0 to all other processes through MPI_Bcast. In other non-rooted collective communications, such as MPI_Allgather, the concurrent inter-SMP communication approach can be applied by exchanging messages instead of transferring messages in one direction as in MPI_Bcast or MPI_Reduce. In MPI_Allgather, every process has a message to broadcast to other processes. The processes first conduct intra-SMP allgather through shared memory. Each of processes participating in inter-SMP communication then exchanges messages with one process from a separate SMP concurrently. The messages received from other SMPs are exchanged with other processes on the same SMP through shared memory allgather at the end of the operation, possibly also between stages of inter-SMP communication. The MPI_Alltoall is different from MPI_Allgather only in that distinct messages are sent from one process to all other processes. MPI_Barrier can be implemented as a MPI_Allgather where all messages are empty, i.e. the messages do not contain data.

Figure 6:
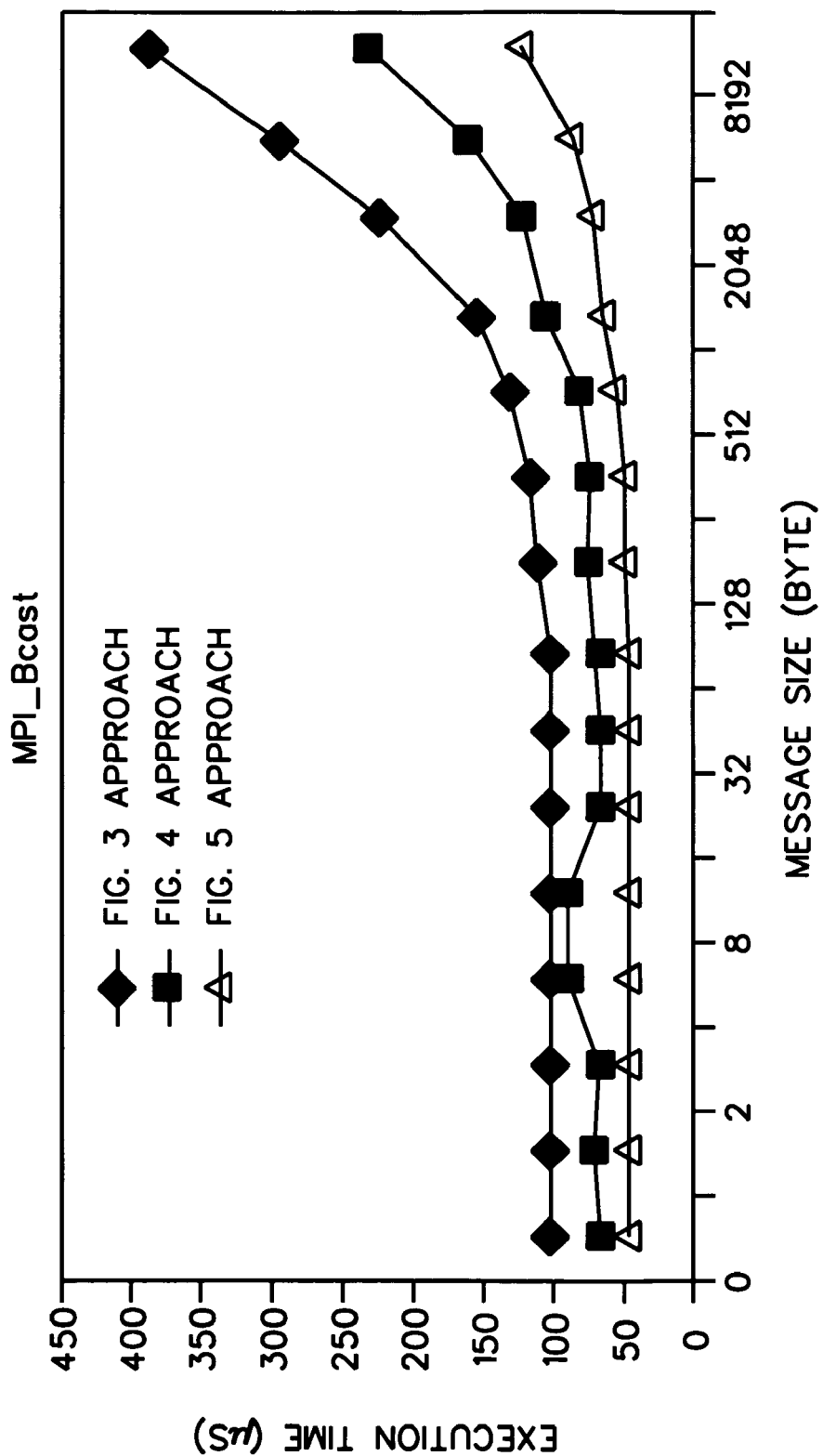
FIG. 6 is a graph of test results showing MPI_Bcast execution time versus message size employing the different message communication approaches of FIGS. 3, 4 & 5, in accordance with certain aspects of the present invention.

Prototypes of the concurrent communication algorithm have been developed for MPI_Barrier, MPI_Bcast and MPI_Reduce. The Intel MPI Benchmark 2.3 (http://www.intel.com/cd/software/products/asmo-na/eng/cluster/mpi/219847.htm) has been run with the prototypes on a cluster of eight 16-way SMP nodes (IBM pSeries Nighthawk II) and the performance numbers of a 64-process (eight processes per SMP) MPI_Bcast are shown in FIG. 6. FIG. 3 approach is the simply binomial tree algorithm. FIG. 4 approach is the binomial tree algorithm plus the collective level shared memory optimization within SNPs. FIG. 5 approach is concurrent communication employing aspects of the present invention. The numbers shown significant performance improvement for the approach of FIG. 5.

The detailed description presented above is discussed in terms of program procedures executed on a computer or network of computers. These procedural descriptions and representations are used by those skilled in the art to most effectively convey the substance of their work to others skilled in the art. They may be implemented in hardware or software, or a combination of the two.

A procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

The invention is preferably implemented in a high level procedural or object-oriented programming language to communicate with a computer. However, the invention can be implemented in assembly or machine language, if desired. In any case, the language may be a compiled or interpreted language.

The invention may be implemented as a mechanism or a computer program product comprising a recording medium. Such a mechanism or computer program product may include, but is not limited to CD-ROMs, diskettes, tapes, hard drives, computer RAM or ROM and/or the electronic, magnetic, optical, biological or other similar embodiment of the program. Indeed, the mechanism or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such the electronic test equipment). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

Again, the capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of communicating among processes in a symmetric multi-processor (SMP) cluster environment, wherein at least some SMP nodes of the SMP cluster comprise multiple processes, the method comprising:
   (i) transferring intra-nodal at an SMP node messages of a collective communication among processes of the SMP node, the transferring comprising employing a shared memory of the SMP node to facilitate the transferring; and
   (ii) responsive to the transferring (i), concurrently transferring inter-nodal multiple messages of the collective communication from n SMP node(s) to m other SMP node(s), wherein at least one of n or m is greater than one and the SMP node is one SMP node of the n SMP nodes or the m other SMP nodes, and wherein the concurrently transferring comprises at least one of: concurrently sending a plurality of messages of the multiple messages from multiple processes of a single SMP node of the n SMP nodes wherein each of the multiple processes concurrently participates in the concurrent sending of the plurality of messages from the multiple processes, or concurrently transferring a plurality of messages of the multiple messages to multiple processes of a single SMP node of the m SMP nodes, the multiple processes concurrently receiving the concurrently transferred plurality of messages.

2. The method of claim 1, wherein the concurrently transferring (ii) comprises concurrently transferring inter-nodal the multiple messages from one of: one SMP node to multiple other SMP nodes, multiple SMP nodes to one other SMP node, or multiple SMP nodes to multiple other SMP nodes.

3. The method of claim 1, wherein the transferring (i) comprises transferring intra-nodal at the SMP node messages of the collective communication from one process of the SMP node to multiple processes of the SMP node by employing the shared memory of the SMP node, and wherein the concurrently transferring (ii) comprises transferring the multiple messages of the collective communication from the SMP node to multiple other SMP nodes, wherein each process of the multiple processes of the SMP node concurrently participates in the concurrent transfer to transfer a message of the multiple messages to a different SMP node of the multiple other SMP nodes.

4. The method of claim 1, wherein the transferring (i) comprises transferring intra-nodal at the SMP node messages from at least two processes to a lead process of the SMP node by employing the shared memory of the SMP node, and wherein the concurrently transferring (ii) comprises concurrently transferring inter-nodal the multiple messages of the collective communication from multiple SMP nodes to the m other SMP node(s), wherein the transferring (i) is repeated across the multiple SMP nodes, and wherein multiple lead processes of the multiple SMP nodes concurrently transfer inter-nodal a plurality of messages of the multiple messages of the collective communication to multiple processes of a single SMP node of the m other SMP node(s).

5. The method of claim 1, further comprising predefining the SMP nodes and processes involved in the transferring (i) and the concurrently transferring (ii) at creation time of the collective communicator employed.

6. The method of claim 1, further comprising automatically repeating at least one of the transferring (i) and the concurrently transferring (ii) for different SMP nodes and processes until completing the collective communication.

7. The method of claim 1, wherein the collective communication occurs within a message passing interface (MPI) communicator.

8. The method of claim 1, wherein the at least one of the n SMP node(s) or the m other SMP node(s) comprises multiple communications channels for facilitating the multiple processes' performing of the concurrent transferring.

9. A computer system for communicating among processes in a symmetric multi-processor (SMP) cluster environment, wherein at least some SMP nodes of the SMP cluster comprise multiple processes, the computer system comprising:
   a memory; and
   a processor in communications with the memory, wherein the computer system is configured to perform a method, said method comprising:
      (i) transferring intra-nodal at an SMP node messages of a collective communication among processes of the SMP node, the transferring comprising employing a shared memory of the SMP node to facilitate the transferring; and
      (ii) responsive to the transferring (i), concurrently transferring inter-nodal multiple messages of the collective communication from n SMP node(s) to m other SMP node(s), wherein at least one of n or m is greater than one and the SMP node is one SMP node of the n SMP nodes or the m other SMP nodes, and wherein the concurrently transferring comprises at least one of: concurrently sending a plurality of messages of the multiple messages from multiple processes of a single SMP node of the n SMP nodes wherein each of the multiple processes concurrently participates in the concurrent sending of the plurality of messages from the multiple processes, or concurrently transferring a plurality of messages of the multiple messages to multiple processes of a single SMP node of the m SMP nodes, the multiple processes concurrently receiving the concurrently transferred plurality of messages.

10. The system of claim 9, wherein the concurrently transferring (ii) comprises concurrently transferring inter-nodal the multiple messages from one of: one SMP node to multiple other SMP nodes, multiple SMP nodes to one other SMP node, or multiple SMP nodes to multiple other SMP nodes.

11. The system of claim 9, wherein the transferring (i) comprises transferring intra-nodal at the SMP node messages of the collective communication from one process of the SMP node to multiple processes of the SMP node by employing the shared memory of the SMP node, and wherein the concurrently transferring (ii) comprises transferring the multiple messages of the collective communication from the SMP node to multiple other SMP nodes, wherein each process of the multiple processes of the SMP node concurrently participates in the concurrent transfer to transfer a message of the multiple messages to a different SMP node of the multiple other SMP nodes.

12. The system of claim 9, wherein the transferring (i) comprises transferring intra-nodal at the SMP node messages from at least two processes to a lead process of the SMP node by employing the shared memory of the SMP node, and wherein the concurrently transferring (ii) comprises concurrently transferring inter-nodal the multiple messages of the collective communication from multiple SMP nodes to the m other SMP node(s), wherein the transferring (i) is repeated across the multiple SMP nodes, and wherein multiple lead processes of the multiple SMP nodes concurrently transfer inter-nodal a plurality of messages of the multiple messages of the collective communication to multiple processes of a single SMP node of the m other SMP node(s).

13. The system of claim 9, wherein the method further comprises predefining the SMP nodes and processes involved in the transferring (i) and the concurrently transferring (ii) at creation time of the collective communicator employed.

14. The system of claim 9, wherein the at least one of the n SMP node(s) or the m other SMP node(s) comprises multiple communications channels for facilitating the multiple processes' performing of the concurrent transferring.

15. A computer program product for communicating among processes in a symmetric multi-processor (SMP) cluster environment, wherein at least some SMP nodes of the SMP cluster comprise multiple processes, the computer program product comprising:
   a non-transitory storage medium readable by a processor and storing executable instructions for execution by the processor to perform a method comprising:
      (i) transferring intra-nodal at an SMP node messages of a collective communication among processes of the SMP node, the transferring comprising employing a shared memory of the SMP node to facilitate the transferring; and
      (ii) responsive to the transferring (i), concurrently transferring inter-nodal multiple messages of the collective communication from n SMP node(s) to m other SMP node(s), wherein at least one of n or m is greater than one and the SMP node is one SMP node of the n SMP nodes or the m other SMP nodes, and wherein the concurrently transferring comprises at least one of: concurrently sending a plurality of messages of the multiple messages from multiple processes of a single SMP node of the n SMP nodes wherein each of the multiple processes concurrently participates in the concurrent sending of the plurality of messages from the multiple processes, or concurrently transferring a plurality of messages of the multiple messages to multiple processes of a single SMP node of the m SMP nodes, the multiple processes concurrently receiving the concurrently transferred plurality of messages.

16. The computer program product of claim 15, wherein the concurrently transferring (ii) comprises concurrently transferring inter-nodal the multiple messages from one of: one SMP node to multiple other SMP nodes, multiple SMP nodes to one other SMP node, or multiple SMP nodes to multiple other SMP nodes.

17. The computer program product of claim 15, wherein the transferring (i) comprises transferring intra-nodal at the SMP node messages of the collective communication from one process of the SMP node to multiple processes of the SMP node by employing the shared memory of the SMP node, and wherein the concurrently transferring (ii) comprises transferring the multiple messages of the collective communication from the SMP node to multiple other SMP nodes, wherein each process of the multiple processes of the SMP node concurrently participates in the concurrent transfer to transfer a message of the multiple messages to a different SMP node of the multiple other SMP nodes.

18. The computer program product of claim 15, wherein the transferring (i) comprises transferring intra-nodal at the SMP node messages from at least two processes to a lead process of the SMP node by employing the shared memory of the SMP node, and wherein the concurrently transferring (ii) comprises concurrently transferring inter-nodal the multiple messages of the collective communication from multiple SMP nodes to the m other SMP node(s), wherein the transferring (i) is repeated across the multiple SMP nodes, and wherein multiple lead processes of the multiple SMP nodes concurrently transfer inter-nodal a plurality of messages of the multiple messages of the collective communication to multiple processes of a single SMP node of the m other SMP node(s).

19. The computer program product of claim 15 wherein the method further comprises pre-defining the SMP nodes and processes involved in the transferring (i) and the concurrently transferring (ii) at creation time of the collective communicator employed.

20. The computer program product of claim 15, wherein the at least one of the n SMP node(s) or the in other SMP node(s) comprises multiple communications channels for facilitating the multiple processes' performing of the concurrent transferring.

21. A method of communicating among processes in a symmetric multi-processor (SMP) cluster environment, wherein at least some SMP nodes of the SMP cluster comprise multiple processes, the method comprising:
   transferring intra-nodal at an SMP node messages of a collective communication among processes of the SMP node, the transferring comprising employing a shared memory of the SMP node to facilitate the transferring; and
   wherein the intra-nodal transfer of messages at the SMP node is to facilitate subsequent concurrent transferring inter-nodal of multiple messages of the collective communication from n SMP node(s) to m other SMP node(s), wherein at least one of n or m is greater than one and the SMP node is one SMP node of the n SMP nodes or the m other SMP nodes, and wherein the subsequent concurrent transferring comprises at least one of: concurrently sending a plurality of messages of the multiple messages from multiple processes of a single SMP node of the n SMP nodes wherein each of the multiple processes concurrently participates in the concurrent sending of the plurality of messages from the multiple processes, or concurrently transferring a plurality of messages of the multiple messages to multiple processes of a single SMP node of the m SMP nodes, the multiple processes concurrently receiving the concurrently transferred plurality of messages.

* * * * *